United States Patent [19]

Gladding

[11] Patent Number: 5,011,003
[45] Date of Patent: Apr. 30, 1991

[54] FULL DIAMETER HINGE ROD AND NOTCHED HARVESTER FASTENER

[75] Inventor: Alfred E. Gladding, Naperville, Ill.

[73] Assignee: Flexible Steel Lacing Company, Downers Grove, Ill.

[21] Appl. No.: 332,228

[22] Filed: Mar. 31, 1989

[51] Int. Cl.$^5$ ............................................. B65G 17/00
[52] U.S. Cl. ................................ 198/728; 198/844.1; 211/33 B; 211/33 P
[58] Field of Search ............... 198/844, 848, 849, 850, 198/851, 853, 728, 731; 24/33 B, 33 P, 31 H, 33 R, 33 F, 33 K

[56] References Cited

U.S. PATENT DOCUMENTS

| | | | |
|---|---|---|---|
| 305,541 | 9/1884 | Southwick | 24/33 B |
| 1,075,078 | 10/1913 | Wilkinson | 24/33 B |
| 2,384,404 | 9/1945 | Soule et al. | 24/33 B |
| 4,023,671 | 5/1977 | Kramer | 198/844 X |
| 4,597,137 | 7/1986 | Droppleman et al. | 24/33 P |
| 4,815,587 | 3/1989 | Musil | 198/844 X |

FOREIGN PATENT DOCUMENTS

| | | | |
|---|---|---|---|
| 0003051 | 3/1885 | United Kingdom | 24/33 B |
| 015049 | 5/1893 | United Kingdom | 24/33 B |
| 0006593 | 3/1909 | United Kingdom | 24/33 B |
| 0186012 | 9/1922 | United Kingdom | 24/33 B |
| 0287042 | 9/1928 | United Kingdom | 24/33 B |
| 0464068 | 10/1936 | United Kingdom | 24/33 B |
| 0560353 | 3/1944 | United Kingdom | 24/33 B |

Primary Examiner—Joseph E. Valenza
Assistant Examiner—James R. Bidwell
Attorney, Agent, or Firm—Fitch, Even, Tabin & Flannery

[57] ABSTRACT

A conveyor belt assembly is provided with a pair of spaced parallel endless conveyor belts which are spanned by a plurality of equally spaced, parallel rods. Each of the conveyor belts are joined together at their opposite belt ends by a pair of belt fasteners secured to the belts and having hinge loops intermeshed and connected by a hinge pin. The preferred pin has a constant diameter and retainers at opposite ends of the hinge pin to abut the belt fasteners to prevent lateral sliding of the hinge pin. The preferred retainers are enlarged heads on opposite ends of the hinge pin. Other retainers are tru-arc rings positioned in grooves formed in the hinge pin. The preferred belt fasteners are all identical in shape and have first and second notches in their respective side edges to receive the enlarged heads. When the belt fastener is forwardly facing, the enlarged head will be nested in a first notch; and where the belt fastener is rearwardly facing the enlarged head will be in the second notch. In another embodiment, the belt fasteners are made substantially narrower than the belt width to leave room for retainers at the outer edges of the belt fasteners without interference with side edge guides for the conveyor belt.

3 Claims, 3 Drawing Sheets

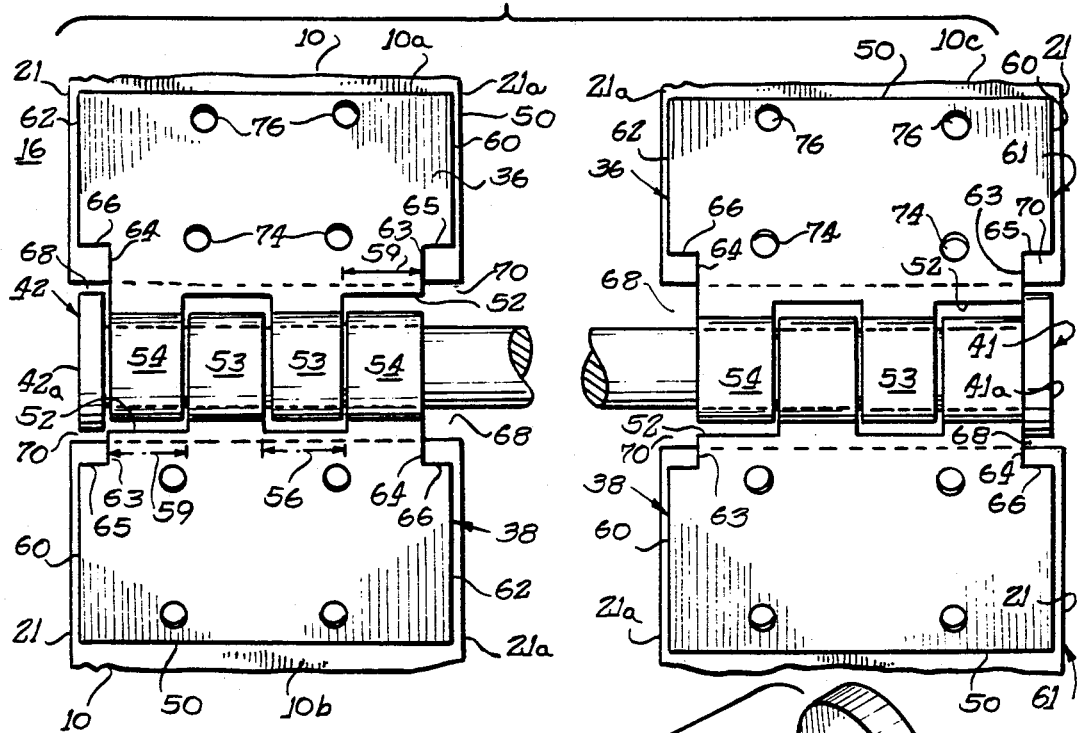
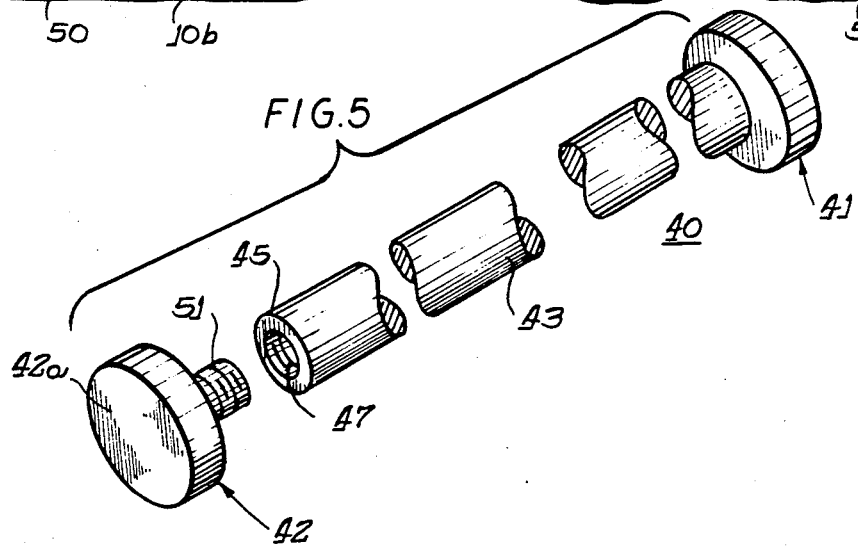

5,011,003

FULL DIAMETER HINGE ROD AND NOTCHED HARVESTER FASTENER

BACKGROUND OF THE INVENTION

The present invention relates to an improved fastener, and more particularly to a hinge-type fastener for joining the belt ends of a conveyor belt, which may be utilized for harvesting or other transport operations.

Harvester belts of the type disclosed in U.S. patent application Ser. No. 864,972, filed May 20, 1986 now U.S. Pat. No. 4,815,587, have a pair of belts spaced from each other and spanned by parallel grading rods. The grading rods are fastened at opposite ends to the belts with the respective axes of the belts being parallel and the rods being equally spaced along the top surfaces of the belts. The belts are endless when joined together at opposed belt ends by belt fasteners having intermeshed hinge loops coupled with a hinge rod or pin inserted into the hinge loops to form a hinged joint between the belt ends. As disclosed in the aforesaid application, the hinge pin is also a grading rod, spanning the belts with opposite hinge pin ends inserted into the hinge loops. These hinge pin ends are a smaller diameter than the full diameter of the central grading rod portion of the hinge pin. The reduction in diameter defines an internal shoulder located adjacent the inner edge of each belt fastener and these shoulders will abut the inner hinge loops at either belt side to prevent the belt ends from sliding laterally with the hinge loops. If the hinge pin were not formed with these shoulders, the hinge pin would work its way laterally from the hinge loops on one side, causing a failure of this hinge splice. The reduction in diameter makes these hinge pins weaker at the belt splice ends of the grading rods.

Typically, the outer edges of the respective belts and/or belt fasteners travel within enclosures that include side edge guides. These side edge guides determined the maximum width for the conveyor belt. Also, as explained in the above-identified patent application, it is preferred that the hinge pin be on and remain on the same arcuate path of travel as the other grading rods to minimize radial inward or outward movement of the belt fasteners and the belt attached thereto. This radially inward and outward movement of the non-flexible belt fasteners has heretofore resulted in a "clunking" sound and vibrations. Also, this radial movement and flexing of the belt subjects the belt to wear and to elongation of the belt apertures for the fastener bolts securing the belt fasteners to the belt ends.

As explained in the above-identified copending patent application, the belt fasteners are preferably identical in shape rather than having male and female shaped belt fasteners, thereby reducing inventory requirements in half. Thus, the present invention provides identically-shaped belt fasteners, which allow a full-diameter hinge pin rod to be inserted to couple the belt fasteners together without causing undue radial flexing or bumping of the belt and belt fasteners as they pass about the pulleys or drive sprockets therefor. Retainers hold the ends of the full-diameter hinge pins from sliding laterally from hinge-receiving loops intermeshed between adjacent belt fasteners on opposite ends of a belt. The retainers are mounted within the outer edges of the belt.

SUMMARY OF THE INVENTION

The present invention provides a belt fastener assembly for connecting the ends of a conveyor belt to form a continuous belt. The belt-mounted plates with the hinge loops attached thereto provide a means for moving the belt pitch line from the longitudinal axis of the belt to a position radially or outwardly displaced from the outer belt surface, which minimizes the deflection of the belt from the sprocket, pulley or other drive means and minimizes the noise associated with the traversal of the fastener assembly over the drive means. Further, a pair of hinge assemblies are operable as coupling means between two parallel running conveyor belts joined by a series of parallel rods. In this configuration, a hinge pin extends through the dual fastener arrangement, and provides a parallel rod for the assembly, which is parallel to and equally spaced with the series of other parallel rods. The hinge pins are formed without the shoulders and without reduced diameter ends of the prior art hinge pins. The hinge pins are held against lateral sliding from the belt fasteners by retainers on the opposite ends of the hinge pin and located within the lateral confines of the outer edges of the respective belts. The preferred retainers include enlarged heads on opposite ends of the hinge pin and inserted into notches formed in the belt fastener plates.

BRIEF DESCRIPTION OF THE DRAWINGS

In the Figures of the drawings, like reference numerals identify like components, and in the drawings:

FIG. 4 is a top plan view of a pair of hinge fastener assemblies coupled by a hinge pin;

FIG. 5 is a perspective view of the hinge pin and threaded bolt member;

DETAILED DESCRIPTION OF THE PREFERRED EMBODIMENT

Conveyor belts are utilized to transfer various items, either alone or in cooperation with at least a second belt. The specific belt arrangement is frequently dictated by the particular use or the goods transported by the belt. A belt or belt pair may be operable over a pulley, a driven roller or a sprocket arrangement, but the fastener arrangement joining the belt ends or belt splices may traverse at least one of these driving means. The traversal of these pulleys, rollers or sprockets by a relatively flat hinge plate is frequently associated with radial displacement of the belt from the sprocket, which induces a belt flexing at the edges of the fastener assembly that can lead to belt failure from fatigue. In addition, the belt flexing also generates an increase in the operating noise.

The present invention provides a belt fastener that is relatively smooth running, has a conforming lower belt surface to minimize the noise from the belt fastener assembly, and also reduces or eliminates the radial belt displacement from the pulleys, sprockets or rollers. The assembly includes arcuate plates with hinge loops pivotable about a hinge pin and broadly conforming to the driving means surface, but operable to provide a generally flat lower surface to the belt in the horizontal or non-sprocket contacting mode. Further, a pair of the fastener assemblies, each connecting a belt, may be joined by a hinge pin parallel to a plurality of parallel rods coupling the belts. The hinge pin is generally in the same longitudinal plane as the plurality of rods, and thus the belt and fasteners move together over the driving pulley or sprocket, which relatively smooth movement over the pulley minimizes belt deflection and thus the belt flexing and associated noise.

Figure 1:
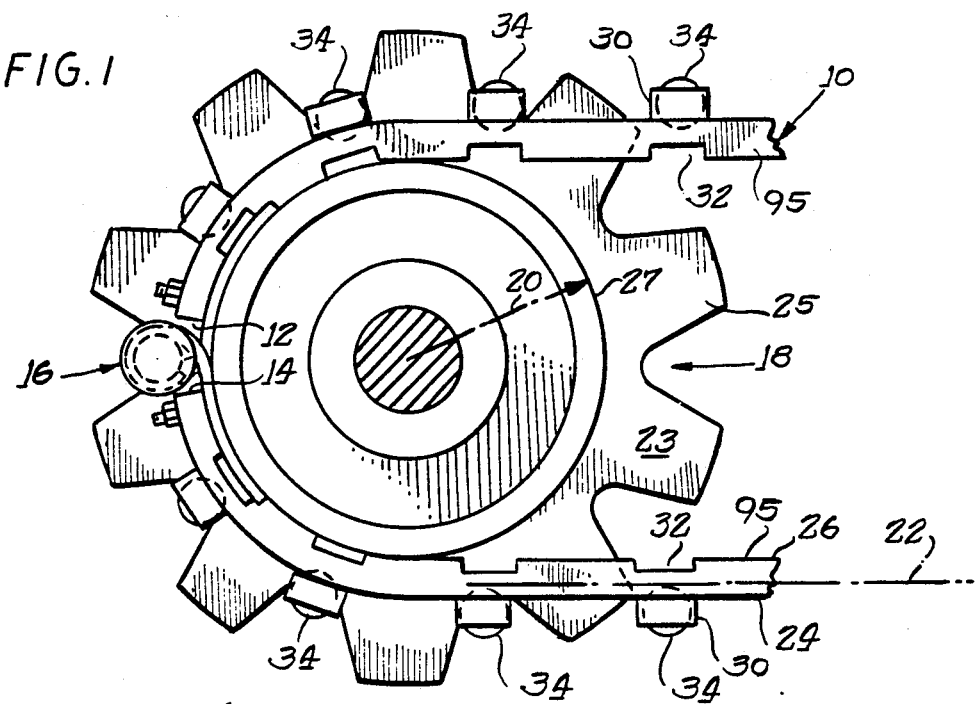
FIG. 1 is a plan view of the belt and fastener assembly in contact with a pulley.

In the drawings, FIG. 1 illustrates a conveyor belt 10 with a first end 12 and a second end 14 joined by a fastener assembly 16. Belt 10 and fastener assembly 16 are illustrated as operating over a pulley-and-sprocket arrangement or drive means 18 with a radius of curvature 20. Conveyor belt 10 includes a longitudinal axis 22, an upper or outer surface 24 and an inner or lower surface 26. A series of parallel rods 34 with ends 30 are mounted on outer surface 24. Lower surface 26 includes a series of notches 32 to receive the rivet ends of rivets 35, which secure parallel rods 34 at rod ends 30 to upper surface 24.

Figure 2:
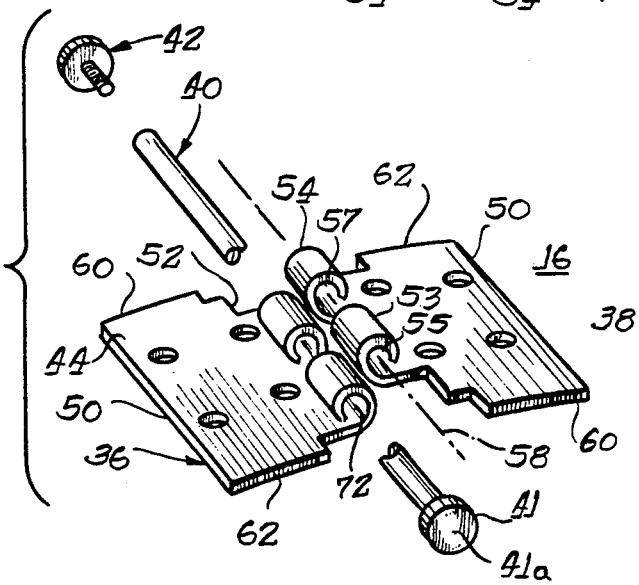
FIG. 2 is an exploded perspective view of a hinge plate and hinge pin fastener assembly.
Figure 3:
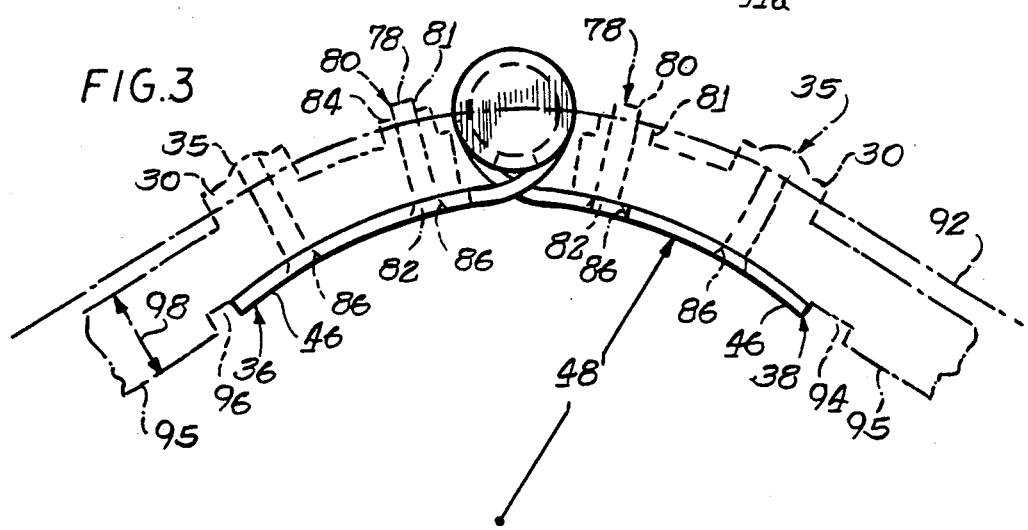
FIG. 3 is a plan view of the fastener and belt.

FIG. 2 illustrates an exploded view of hinge fastener assembly 16, which includes first and second hinge plates 36 and 38 and hinge pin 40. In this Figure, it is noted that plates 36 and 38 are identical in structure and, therefore, only one will be described, however, it will be appreciated that the description is applicable to the second hinge plate. Each of first and second hinge plates 36, 38, respectively, include upper surface 44 and lower surface 46, as shown in FIG. 3. Plates 36 and 38 are arcuate-shaped plates with a radius of curvature 48. At the ends of the arcuate section are first edge 50 and second edge 52. A first and a second hinge loop 53 and 54 with passages 55 and 57, respectively, are secured to each of inner edges 52 in the Figures and have a gap 56 between these hinge loops. Passages 55, 57 are concentric along an axis 58.

Outer side edges 60 and 62 of the intermeshed hinge plates 36 and 38 along with the belt edges 21 and 21a (FIG. 4) define a lateral side for the belt 10. Interior belt edge 21a will either contact or be positioned closely adjacent exterior facing, radial side walls 23 of the drive means 18, which is in the form of a drive sprocket having spaced teeth 25 which are inserted between the rods 34 to abut and drive the rods forwardly about the sprocket in its direction of rotation. The inner lower surface 26 of belt 10 lies on a cylindrical drum surface 27 of the drive sprocket. Heretofore, the hinge pin 40 had reduced-diameter ends to fit within the hinge loops, which were sized to the reduced-diameter ends. The ends of the rods and the ends of the hinge pin are located closely adjacent the exterior radial side walls 23 of the driving teeth 25. The interior shoulders formed on the hinge pin of the prior art hit interior sides 60, 62 of the belt fasteners to prevent lateral shifting of the hinge pin as it traveled between the front and rear sprockets for the endless belt.

In accordance with present invention, the hinge pin 40 may be formed with a constant rod diameter throughout its full length to provide a stronger hinge pin portion within the hinge loops 53 and 54. The hinge pin is preferably held against lateral sliding by retainers such as enlarged ends or heads 41 and 42 on the opposite end of the hinge pin. The retainers are positioned within exterior edges 21 of the belts to avoid interference with sidewalls and side edge guides for the conveyor belts.

In the preferred embodiment, the retainers are provided within the exterior edges 21 of the belts, which is achieved by forming the outer edges 61 of the belt fasteners with notches 68 and 70 therein to receive the enlarged heads 41 and 42 so that outer head surfaces 41a and 42a are substantially flush with outer sides 21 of the respective belts 10. As it is desired to make the belt fasteners identical, the interior facing notches 68 and 70 (FIG. 4) serve no function; but allow each of the four belt fasteners shown in FIG. 4 to have an identical shape. Thus, each belt fastener has a pair of notches 68 and 70 and the orientation of the belt loops determine whether or not notch 68 and 70 has a portion of the enlarged head 41 or 42 therein. It can be seen in FIG. 4 that the illustrated heads 41 and 42 are large enough to fit into the notch 68 on one fastener and the notch 70 on the other meshed fastener. Manifestly, the particular number, shapes and sizes of the notches and heads may vary from that illustrated and still fall within the purview of the invention.

Figure 6:
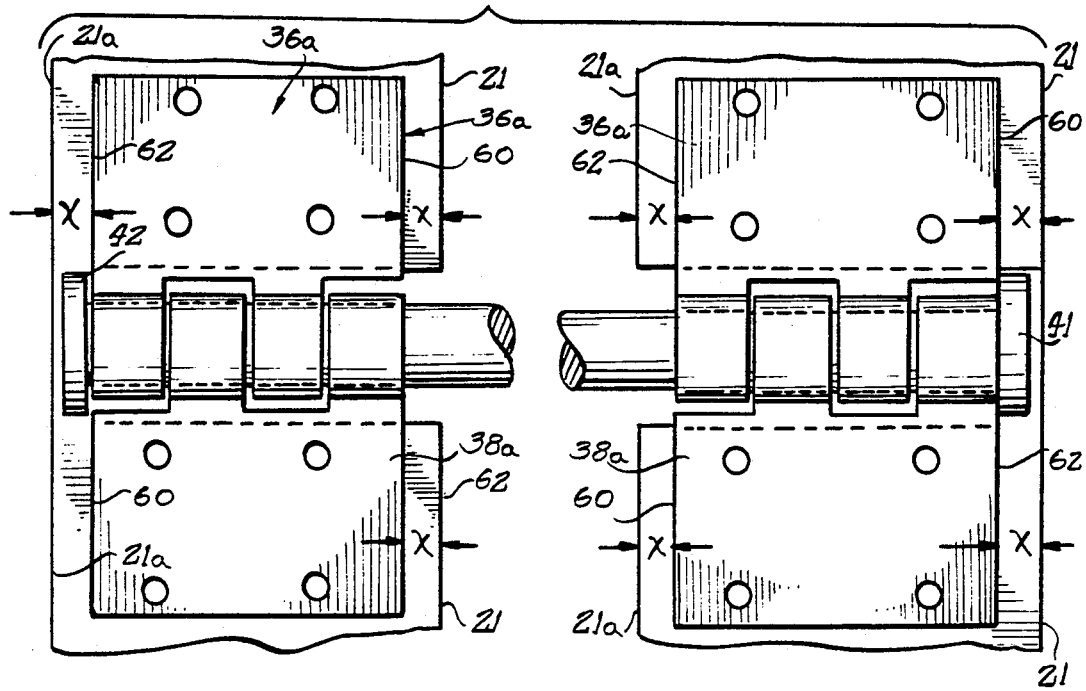
FIG. 6 is a plan view of another embodiment of the invention having a belt and narrow width belt fasteners; and, FIG. 7 is a plan view of a further embodiment of the invention having a retainer in the form of a split ring in a groove on the hinge rod.

As will be explained later in connection with FIG. 6, rather than having notches formed in the belt fastener sidewalls, the entire fastener 36a and 38a (FIG. 6) may be made thinner than the belt width between its edges 21 and 21a, so that the enlarged heads 41 and 42 (FIG. 6) may still be within the confines of the belt edges 21 defining the width of the conveyor. As shown in FIG. 6, each belt fastener may have its edges 60 and 62 separated from the belt edges 21 or 21a by a distance "X", which is slightly greater than the thickness of head 41 or 42. Thus, each head may stay adjacent a belt outer edge 21, and abut a hinge pin loop upon its associated belt fastener and hold the hinge pin against lateral sliding. The belt fasteners 36a an 38a are similar to, and are fastened to, the belt ends in the same manner as the belt fasteners 36 and 38. The only difference between the belt fasteners 36a and 38a of FIG. 6 and the belt fasteners 36 and 38 is that more metal has been removed from the sides of the belt fasteners 36 and 38 to eliminate the notches 68 and 70.

Hinge plates 36, 38 include first and second arc-side edges 60 and 62 intersecting with first and second edges 50 and 52. The respective notches 68 and 70 are each defined by specific wall segments along the sides of the notches. First and second hinge loops 53, 54 are secured to one of edges 50, 52 (edge 52 as shown in the Figures), which has wall segments 63, 64 extending generally perpendicular therefrom and approximately parallel to arc-side edges 60, 62. First wall segments 63, 64 are indented or offset from each of the arc-side edges 60, 62 by a hinge-plate separation wall 65, 66, respectively. Thus, each of the sets of wall segments 63, 65 and 64, 66 cooperates to define a respective notch 68 and 70.

In FIGS. 2 and 4, one of the hinge loops 53, 54 (hinge loop 54 in the Figures), is flush with edge 64 and separated from second outer edge 62 by a separation wall 66. The second of the hinge loops 53, 54 is separated from the second wall segment 63 by a second gap separation distance 59 equivalent to the gap 56 separating the first and second hinge loops along walls 52. In this illustration, hinge plates 36, 38 provide nesting or meshing sites to receive opposed hinge loops 53, 54 of the other of the first and second hinge plates 36, 38, and have along each of the outer edges 60, 62, at the intersection of the cutouts of the opposed plates, first notch 68 and second notch 70, to receive the hinge pin head 41 and bolt heads 42, as above described. The intermeshed or interdigitated loops 53, 54 of plates 36, 38 cooperate to define a hinge aperture 72 in the aligned loop passages 55, 57 to receive hinge pin 40. Hinge pin head 41 and bolt head 42 in a fastener assembly are nested in one of notches 68 and 70.

Hinge plates 36, 38 each have a pair of throughbores 74 and at least a pair of plate-securing passages 76. Bores 74 are operable to receive bolts 78, which include a threaded shaft 80, a head end 82 and a securing nut 84 mounted on the threaded end 81 of shaft 80 to secure bolt 78 to a plate and belt. In FIG. 3 at lower surface 46, plates 36, 38 have countersunk areas 86 at both bores 74 and passages 76. Countersunk areas 86 receive heads 82 of the bolts 78 or other securing means, such as rivets for rod ends 30, and provide a recess for maintaining a flush hinge plate lower surface 46. In FIG. 3, rivets 35 extend through rod ends 30, belt 10 and plates 36, 38, but are flush with lower surface 46 of both hinge plates 36, 38.

A pair of hinge fastener assemblies 16 are illustrated in FIG. 4. Each assembly 16 comprises a pair of first and second belt fasteners or hinge plates 36, 38; and a single hinge pin 40 passing through each of the apertures 72 of hinge loops 53, 54 couples the plates 36, 38 of both assemblies. Hinge pin 40, specifically illustrated in FIG. 5, includes the pin head 41, which may be peened or otherwise formed to prevent its sliding through bore 72 in the hinge loops. The opposite end 45 of shaft 43 has a threaded blind-hole bore 47. In FIG. 4, the first and second plates 36, 38 of each fastener assembly 16 are secured to belt ends 10a and 10b on the left hand side of FIG. 4 and to belt ends 10c and 10d on the right hand side of FIG. 4. The hinge loops 53, 54 of each of hinge plates 36, 38 are intermeshed to define a hinge pin aperture 72. Hinge pin 40 is inserted through both fastener assembly hinge pin apertures 72, and head 41 is nested in outer notches 68 and 70 at the outer edge of one of the belt assemblies. The other end of the hinge pin is inserted through the belt loops at the left hand side of FIG. 4 to position the threaded bore 47 at opposite end 45 of hinge pin 40. The threaded shaft 51 on the enlarged head 42 is then threaded into threaded bore 47 to bring the head 42 into the notches 68 and 70 with the outer surface 42a of the head aligned with the sides 60 and 62 of the belt fasteners and with the outer belt edge 21. Preferably, the outer diameters of the heads 41 and 42 are about equal to the outer diameter of the hinge loops.

In FIG. 3, at each of belt ends 12, 14 on lower surface 26 a reduced cross-sectional area, step or recess 94 and 96, respectively, is provided for receiving and mounting of either of hinge plates 36, 38. In this figure, belt 10 has first thickness 98 and second, narrower thickness 100 at recesses 94 and 96. The belt is formed with a series of spaced lugs 95, and the lugs 95 are removed at the belt ends to form the recesses 96 and 98. This allows the bottom hinge plates to fit on the sprocket without raising the axis of the hinge pin. The plate thickness for each of the plates 36, 38 is approximately equal to the depth of recesses 94 and 96. Thus, as hinge plate fastener assembly 16 disengages from the sprocket, hinge plates 36, 38 pivot on hinge pin 40 and generally align themselves along lower surface 46 to approximately provide a flush or continuous lower surface 26 of belt 10. It will be appreciated that the orientation of hinge plates 36 and 38 is not a limitation to the present invention, as the plates may be mounted on either of belt ends 12, 14 and mated with the other of the plates to define notches 68 and 70 on either outer edge 60, 62, as shown in the drawings.

In FIG. 2, hinge loops 53, 54 extend from one of hinge plates 36 and 38, generally along a longitudinal axis parallel to the longitudinal axis of belt 10, and each of the hinge loops 54 protrude above upper surface 44 of each hinge plate. Therefore, as noted in FIG. 3, the intermeshed hinge loops 54 have their centerline, which is the longitudinal axis of hinge pin 40, generally aligned with bolts 78 and rod ends 30. This alignment of rod ends 30, bolts 78 and hinge pin 40 along a longitudinal axis, which is radially, outwardly displaced with reference to sprocket 18 from the longitudinal axis of belt 10, is a new or second pitch line 92 for continuous belt 10.

A pitch line is the line about which the belt flexes, and it is generally considered to be approximately along the belt longitudinal axis at the midpoint of the belt thickness. Thus, the belt fasteners with a flat plate and a hinge pin in line with the belt axis, maintain the belt pitch line as it traverses a pulley or sprocket, leading to a relatively large displacement from the pulley or sprocket, belt flexing and associated noise. Alternatively, sprocket-conforming plates 36, 38 and the outwardly extended pitch line cooperate to minimize belt displacement, belt flexing and belt-related noise.

Figure 7:
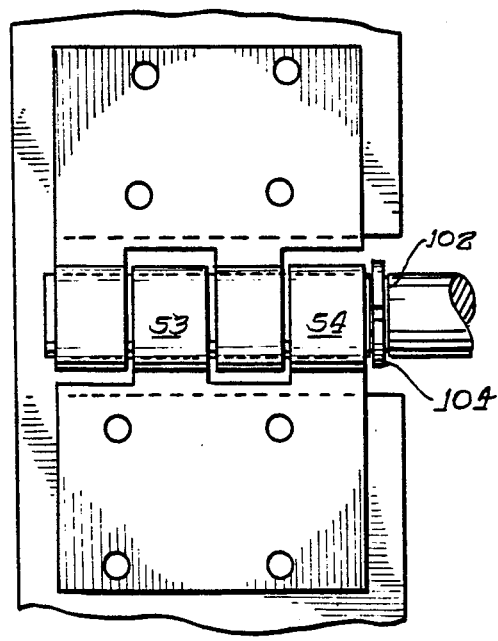

In accordance with another embodiment of the invention, as shown in FIG. 7, the retainer for retaining hinge rod 40 against lateral sliding, comprises a split ring 104 of spring metal having an inner circumference seated within a groove 102 formed in the rod and with an outer diameter portion of the ring positioned to abut against an inner side of a hinge loop 54 of a belt fastener. The right-hand belt fastener (not shown) would have a similar split ring (not shown) to engage the inner side of the inner hinge loop of the belt fastener on the right-hand belt. The annular grooves 102 are usually small, e.g., 0.040 inch in depth and in width, so that the hinge rod is kept as close to a full diameter hinge pin throughout as is possible. The ring height above the hinge pin is several times the 0.040 depth of cut for the groove 102. The split ring is removable by expansion and may be in the form of a tru-arc ring. Rather than having the ring 102 on the inside, it could be located on the outside in place of the enlarged heads.

In operation, the hinge plates are pivotable about hinge pin 40, and as they traverse the circumference of sprocket 18, their inner surface 46 at radius of curvature 48 contacts and, as it is equivalent or approximately equivalent to radius 20 of sprocket 18, effectively conforms the belt radius to the sprocket to minimize radial displacement from sprocket 18, and thus minimizes flexing of the belt during this traversal. In addition, this combination of fastener plate elements minimizes the noise generated from the movement of hinge plate assembly 16 over the sprocket surface. As the hinge fastener assembly 16 disengages from the sprocket surface and travels into a non-contacting mode, fastener plates 36, 38 pivot about hinge pin 40 and provide almost a flat and continuous lower surface 26 to belt 10.

While only a specific embodiment of the invention has been described and shown, it is apparent that various alternatives and modifications can be made thereto. It is therefore, the intention in the appended claims to cover all such modifications and alternatives as may fall within the true scope of the invention.

What is claimed is:

1. In a conveyor belt assembly movable about a drive drum and having a plurality of fading rods equally spaced about an endless loop, the combination comprising:

a first belt having an outer edge and having opposite belt ends to be joined together to form a first endless belt loop, a second belt having an outer edge and having opposite belt ends to be joined together to form a second endless belt loop, a plurality of grading rods spanning said first and second belts, said grading rods being equally spaced from each other at equal distances and parallel to each other and having a predetermined diameter, opposed belt fasteners of identical shape secured to the respective opposite ends of the first and second belts, an outer edge of each belt fastener being located adjacent to or inwardly of the outer edge of a first or second belt, loops formed on the respective belt fasteners on the first and second belts to receive a hinge pin therein, a hinge pin grading rod disposed parallel to said other grading rods and spaced equally therefrom and having opposite ends inserted into intermeshed loops for hingedly connecting the loops of the respectively-opposed belt fasteners to connect the belt fasteners to form the endless first and second belts, said hinge pin grading rod being spaced at the equal spacing from the other grading rods and having a substantially constant diameter between the first and second belts and within the hinge loops, retainer means between the hinge pin grading pin and the belt fasteners to hold the hinge pin grading rod from sliding from the loops, said retainer means being located inwardly of the outer edges of the belts, lugs formed on the bottom of the first and second belts, ends on the belts having reduced thickness and recesses formed by removal of the lugs at the ends of the respective belts, the belt fasteners having a lower plate disposed in one of said recesses to provide a substantially flush lower surface for the bottom or each of the first and second belts as it moves about the drive drum.

2. A conveyor belt assembly in accordance with claim 1 in which the thickness of the lower plate is substantially equal to thickness of a lug.

3. A conveyor belt assembly in accordance with claim 1 in which the lower plates are curved to substantially match the curvature of the drive drum.

* * * * *

UNITED STATES PATENT AND TRADEMARK OFFICE
CERTIFICATE OF CORRECTION

PATENT NO. : 5,011,003
DATED : April 30, 1991
INVENTOR(S) : Alfred E. Gladding

It is certified that error appears in the above-identified patent and that said Letters Patent is hereby corrected as shown below:

Column 1, Line 11, after "1986" insert a comma.

Column 7, Line 2, change "fading" to --grading--.

Column 8, Line 19, change "or" to --of--.

Signed and Sealed this

Twenty-ninth Day of September, 1992

Attest:

DOUGLAS B. COMER

Attesting Officer      Acting Commissioner of Patents and Trademarks